United States Patent [19]

Elmore et al.

[11] 4,315,044

[45] Feb. 9, 1982

[54] STABLE AQUEOUS EPOXY DISPERSIONS

[75] Inventors: Jimmy D. Elmore; Joseph L. Cecil, both of Louisville, Ky.

[73] Assignee: Celanese Corporation, New York, N.Y.

[21] Appl. No.: 204,101

[22] Filed: Nov. 5, 1980

[51] Int. Cl.³ .................... B05D 3/00; C08L 63/02
[52] U.S. Cl. ........................ 427/386; 260/29.2 EP; 260/29.2 N; 260/29.3; 260/29.4 R; 427/388.4
[58] Field of Search ............... 260/29.2 EP, 348.64, 260/29.2 N, 29.4 R, 29.3; 525/524, 396; 528/418; 427/386

[56] References Cited

U.S. PATENT DOCUMENTS

| | | | |
|---|---|---|---|
| 2,811,495 | 10/1957 | Wittcoff et al. | 260/18 |
| 2,899,397 | 8/1959 | Aelony et al. | 260/18 |
| 2,990,396 | 6/1961 | Clark et al. | 260/47 |
| 3,020,250 | 2/1962 | Norwalk | 260/7 |
| 3,055,876 | 9/1962 | Grotz | 260/87.1 |
| 3,238,170 | 3/1966 | Wolff et al. | 260/29.6 |
| 3,249,412 | 5/1966 | Kolek et al. | 65/3 |
| 3,301,804 | 1/1967 | Zora et al. | 260/29.2 |
| 3,324,041 | 6/1967 | Sommer et al. | 252/311.5 |
| 3,355,409 | 11/1967 | Bissot | 260/29.6 |
| 3,374,286 | 3/1968 | Hicks | 525/510 |
| 3,383,347 | 5/1968 | Pettit | 260/28 |
| 3,438,924 | 4/1969 | Chalmers et al. | 260/29.7 |
| 3,449,281 | 6/1969 | Sullivan et al. | 260/292 |
| 3,538,033 | 11/1970 | Hayashi et al. | 260/29.2 EP |
| 3,563,943 | 2/1971 | Davis et al. | 260/29.2 |
| 3,634,348 | 1/1972 | Carter | 260/18 EP |
| 3,640,926 | 2/1972 | Slater et al. | 260/18 EP |
| 3,983,056 | 9/1976 | Hosoda et al. | 260/29.2 EP |
| 4,048,179 | 9/1977 | Shen et al. | 260/29.4 R |
| 4,073,762 | 2/1978 | Hosoda et al. | 260/29.3 |
| 4,122,067 | 10/1978 | Anderson | 260/29.2 EP |
| 4,177,177 | 12/1979 | Vanderhoff et al. | 260/29.2 M |
| 4,197,389 | 4/1980 | Becker et al. | 528/103 |

Primary Examiner—Theodore E. Pertilla
Attorney, Agent, or Firm—Herbert P. Price; T. J. Morgan

[57] ABSTRACT

Stable epoxy dispersion compositions are prepared by emulsifying in water a self-emulsifying epoxy resin film forming component which is the reaction product of (a) a diglycidyl ether of a dihydric phenol, (b) a dihydric phenol and (c) a diglycidyl ether of a polyoxyalkylene glycol. The stable dispersions can be modified by the addition of an aliphatic monoepoxide reactive diluent to the dispersion. The epoxy dispersion compositions when combined with epoxy resin curing agents are useful as coating compositions.

19 Claims, No Drawings

STABLE AQUEOUS EPOXY DISPERSIONS

BACKGROUND OF THE INVENTION

The need to reduce air pollution hazards caused by volatile organic solvents has increased the importance of water-borne resin coating systems.

As described in U.S. Pat. Nos. 4,048,179 and 4,073,762, various resins have been developed for aqueous paint compositions, and epoxy resins are often employed when such coating properties as rust prevention and chemical resistance are regarded as essential for particular applications.

U.S. Pat. No. 3,238,170 describes an aqueous epoxy resin composition comprising (1) a polyepoxy resin and (2) a copolymer of an alkyl ester of an $\alpha,\beta$-ethylenically unsaturated monocarboxylic acid and an alkyl half ester of itaconic acid, which is an aqueous coating composition having good alkali resistance, adhesion and storage stability.

An aqueous emulsion comprising an epoxy resin and a protein acting as protective colloid, and an emulsion comprising a mixture of an amine-epoxy resin condensate and an epoxy resin, are disclosed in U.S. Pat. Nos. 3,020,250 and 3,449,281.

Further, attention has been directed to various emulsifiers which are adapted for emulsification of epoxy resins in water. For example, an aqueous emulsion of an epoxy resin in which a reaction product of a boric acid ester derived from boric acid with both an alkylene glycol and a $\beta$-dialkyl-substituted aminoalkanol is employed as an emulsifier is described in U.S. Pat. No. 3,301,804. A polyepoxide emulsion for electrodeposition in which a polyepoxide is emulsified with an emulsifying agent of the phosphate ester type is described in U.S. Pat. No. 3,634,348. An epoxy resin emulsion for sizing glass fibers in which a cationic emulsifying agent selected from the group consisting of imidazolines and amides and a non-ionic emulsifying agent are used in combination in U.S. Pat. No. 3,249,412.

Also, various curing agents for epoxy resin emulsion compositions are known in the art. For example, curing agents for epoxy resin compositions include a polyamide reaction product derived from a polymeric fatty acid and an aliphatic polyamine containing terminal amino groups (U.S. Pat. No. 2,811,495 and U.S. Pat. No. 2,899,397), a salted amine derived from a carboxylic acid having 1-8 carbon atoms and a tertiary amine (U.S. Pat. No. 3,640,926), a polyamide derived from a diamine and a dicarboxylic acid (U.S. Pat. No. 3,355,409), a phenol modified polyamine (U.S. Pat. No. 3,383,347), an amino-containing polyamide prepared by reacting a polyamine with a polymerized fatty acid (U.S. Pat. No. 3,324,041), and the like.

In most cases a bisphenol type of epoxy resin is employed as a film-forming component of an aqueous epoxy resin paint composition. However, a bisphenol type of epoxy resin as an aqueous dispersion component normally has the disadvantage that it tends to crystallize and settle out when the aqueous dispersion is stored for three months or longer under ambient conditions.

Destruction of emulsion particles usually occurs with advance of crystallization, and thereafter it is impossible to restore the original state even by heating. Thus, an aqueous epoxy resin paint has the disadvantage that if crystallization occurs the crystallized paint cannot be used for coating purposes.

Some recent developments relate to the production of water-borne epoxy resin systems which exhibit improved properties under ambient conditions.

U.s. Pat. No. 4,048,179 describes a process for preparing water-dilutable, heat-curing coating compositions comprising (a) reacting an aromatic polyglycidyl ether with a polyethylene glycol in the presence of 0 to 20% of a polyhydric phenol, (b) adding an aminoplast curing agent, and (c) diluting with water to give a stable aqueous composition.

U.S. Pat. No. 4,073,762 describes an aqueous epoxy resin paint composition comprising an epoxy resin emulsion formed by emulsifying in water (a) 98 to 50% by weight of a bisphenol type epoxy resin and (b) 2 to 50% by weight novolak type epoxy resins, with a non-ionic surface active agent, and a curing agent incorporated in said epoxy resin emulsion.

There remains a need for improved stable aqueous epoxy resin dispersions which are adapted for application as industrial maintenance coating systems.

Accordingly, it is an object of this invention to provide an aqueous dispersion of a bisphenol A type epoxy resin, which exhibits long term stability under ambient storage conditions.

It is another object of this invention to provide a freeze-thaw resistant water-borne paint composition containing self-emulsifying epoxy resin, which paint composition can be applied as a coating that cures at room temperature to form a continuous thermoset film.

Other objects and advantages of the present invention shall become apparent from the accompanying description and examples.

DESCRIPTION OF THE INVENTION

One or more objects of the present invention are accomplished by the provision of a stable epoxy dispersion composition comprising (1) an aqueous medium; and (2) between about 50-70 weight percent of self-emulsifying epoxy resin which is the addition product of reactants comprising (a) 40-90 parts by weight of diglycidyl ether of dihydric phenol, (b) 5-35 parts by weight of dihydric phenol, and (c) 2-15 parts by weight of diglycidyl ether of polyoxyalkylene glycol, wherein the molecular weight of the epoxy resin is in the range between about 500-20,000.

In one embodiment, this invention provides a stable epoxy dispersion composition comprising (1) an aqueous medium; (2) between about 50-70 weight percent of self-emulsifying epoxy resin which is the addition product of reactants comprising (a) 40-90 parts by weight of diglycidyl ether of dihydric phenol, (b) 5-35 parts by weight of dihydric phenol, and (c) 2-15 parts by weight of diglycidyl ether of polyoxyalkylene glycol, wherein the molecular weight of the epoxy resin is in the range between about 500-20,000; and (3) 1-25 weight percent, based on resin solids weight, of water-immiscible $C_8$-$C_{20}$ aliphatic monoepoxide reactive diluent.

In another embodiment, this invention provides a freeze-thaw resistant epoxy dispersion composition comprising (1) an aqueous medium; (2) between about 50-70 weight percent of self-emulsifying epoxy resin which is the addition product of reactants comprising (a) 40-90 parts by weight of diglycidyl ether of dihydric phenol, (b) 5-35 parts by weight of dihydric phenol and (c) 2-15 parts by weight of diglycidyl ether of polyoxyalkylene glycol, wherein the molecular weight of the epoxy resin is in the range between about 500-20,000; (3) 1-25 weight percent, based on resin solids weight, of water-immiscible $C_8$–$C_{20}$ aliphatic monoepoxide reactive diluent; and (4) 5–20 weight percent, based on resin solids weight, of water-miscible solvent selected from $C_2$–$C_{10}$ glycols and glycol ethers.

In a further embodiment, this invention provides a water-borne paint composition comprising (1) an aqueous medium; (2) between about 50–70 weight percent of self-emulsifying epoxy resin which is the addition product of reactants comprising (a) 40–90 parts by weight of diglycidyl ether of dihydric phenol, (b) 5–35 parts by weight of dihydric phenol, and (c) 2–15 parts by weight of diglycidyl ether of polyoxyalkylene glycol, wherein the average molecular weight of the epoxy resin is in the range between about 500–20,000; and (3) polyamine curing agent, wherein the ratio of active amino hydrogens to epoxy groups is in the range between about 0.5–2:1.

Dihydric Phenol And Glycidyl Ether Components

The dihydric phenol component and the diglycidyl ether of dihydric phenol component of the epoxy resin may contain other substituents such as alkyl, aryl, sulfido, sulfonyl, halo, and the like.

Illustrative of suitable dihydric phenols are 2,2-bis(4-hydroxyphenyl)propane, 2,2-bis(3-bromo-4-hydroxyphenyl)-propane, 2,2-bis(3,5-dichloro-4-hydroxyphenyl)propane, 2,2-bis(3-chloro-4-hydroxyphenyl)-propane, bis(4-hydroxyphenyl)-methane, bis(4-hydroxyphenyl)sulfone, bis(4-hydroxyphenyl)sulfide, resorcinol, hydroquinone, and the like. The preferred dihydric phenols are 2,2-bis(4-hydroxyphenyl)propane (bisphenol A) and bis(4-hydroxyphenyl)methane for reasons of cost and availability.

The diglycidyl ether derivatives are prepared by the reaction of a dihydric phenol with a halogen-containing epoxide or dihalohydrin in the presence of an alkaline medium. By varying the ratios of the dihydric phenol and epichlorohydrin reactants, different molecular weight products can be obtained as described in U.S. Pat. Nos. 2,582,985; 2,615,007; and 2,633,458.

For purposes of the present invention, optionally at least a portion of the diglycidyl ether of dihydric phenol component can be replaced with a diglycidyl ether of a hydrogenated dihydric phenol derivative. For example, the said diglycidyl ether of dihydric phenol can have up to essentially 100 percent of its weight substituted by a diglycidyl alicyclic ether such as 2,2-bis(4-hydroxycyclohexyl)propane or bis(4-hydroxycyclohexyl)methane.

Glycol Glycidyl Ether Component

An important feature of the stable aqueous dispersions of the present invention is the incorporation of a diglycidyl ether of polyoxyalkylene glycol component into the curable epoxy resin vehicle of the aqueous systems.

The preferred diglycidyl ether of polyoxyalkylene glycol derivatives are those having a molecular weight in the range between about 4000–20,000. The said glycol ethers are conveniently prepared by reacting epichlorohydrin with a selected polyoxyalkylene glycol, in a molar proportion which provides substantially a diglycidyl ether reaction product.

The polyoxyalkylene glycol reactant usually is soluble or at least partially soluble in water. Polyalkylene glycol type compounds are prepared conveniently by the condensation of an alkylene oxide with a suitable polyhydric alcohol. Illustrative of alkylene oxides are ethylene oxide and propylene oxide and mixtures thereof. Illustrative of polyhydric alcohols are aliphatic alcohols such as ethylene glycol, 1,3-propylene glycol, 1,2-propylene glycol, 1,4-butylene glycol, 1,3-butylene glycol, 1,2-butylene glycol, 1,5-pentandiol, 1,4-pentandiol, 1,3-pentandiol, 1,6-hexandiol, 1,7-heptandiol, glycerol, 1,1,1-trimethylolpropane, 1,1,1-trimethylolethane, hexan-1,2,6-triol, pentaerythritol, sorbitol, 2,2-bis(4-hydroxycyclohexyl)propane, and the like.

Preferred polyoxyalkylene glycols are those prepared by the reaction of ethylene oxide and/or propylene oxide with a dihydric aliphatic alcohol, e.g., ethylene glycol. Illustrative of polyoxyalkylene glycols are commercial Pluronic (BASF-Wyandotte) type products which are block copolymers of ethylene oxide and propylene oxide of about 5000–10,000 molecular weight, containing from about 50 to about 90 weight percent ethylene oxide and about 10 to about 50 weight percent propylene oxide.

Reactive Diluent Component

The highly preferred stable aqueous epoxy resin dispersions of the present invention are those which contain a water-immiscible $C_8$–$C_{20}$ aliphatic monoepoxide reactive diluent component. The said monoepoxide component can contain alicyclic and aromatic structures, as well as halogen, sulfur, phosphorus, and other such heteroatoms.

Illustrative of monoepoxide reactive diluents are epoxidized unsaturated hydrocarbons such as decene and cyclohexene; glycidyl ethers of monohydric alcohols such as 2-ethylhexanol, dodecanol and eicosanol; glycidyl esters of monocarboxylic acids such as hexanoic acid; acetals of glycidaldehyde; and the like. The preferred reactive diluent is glycidyl ether of monohydric $C_8$–$C_{17}$ aliphatic alcohols.

The presence of a water-immiscible $C_8$–$C_{20}$ aliphatic monoepoxide reactive diluent in an aqueous epoxy resin dispersion has a significant beneficial effect on the properties of the aqueous dispersion. The said water-immiscible reactive diluent appears to function by coating the particles of epoxy resin solids and thereby providing the aqueous dispersion with improved shear, freeze-thaw resistance, shelf viscosity stability, and paint gloss.

Also, since the reactive diluent is epoxy functional, it becomes incorporated into the film-forming substrate during the subsequent room temperature curing of the aqueous dispersion composition after it has been blended with a curing agent and coated on a surface. The total quantity of reactive diluent contributes to the calculated proportion of non-volatiles in the dispersion composition.

Curing Agent

A room temperature curable water-borne coating composition is prepared by admixing a stable epoxy dispersion composition as described above with an epoxy-interacting curing vehicle, such as a polyamine curing agent. The ratio of active amino hydrogens to epoxy groups in the admixture is in the range of 0.5–2:1 and, preferably, is in the range between about 0.8–1.5:1. For purposes of industrial maintenance paint compositions, the amino hydrogens must be sufficiently reactive to effect crosslinking interaction with the epoxy groups at ambient temperatures.

Suitable polyamine curing agents are those which are soluble or dispersible in water and which contain more than 2 active hydrogen atoms per molecule. Examples of such curing agents are alkylene polyamines represented by the formula $$H_2N\ R(NH\ R)_xNH_2$$

wherein R is an alkylene radical containing 2 to 4 carbon atoms and X has the value of 0 to 5. Such alkylene polyamines are ethylene diamine, diethylene triamine, triethylene tetramine, tetraethylene pentamine, pentaethylene hexamine, propylene diamine, dibutylene triamine, and the like. Other polyamine curing agents are the polyamido amines, which are reaction products of alkylene polyamines and fatty acids. Such polyamidoamines are well known in the art and are described in U.S. Pat. Nos. 2,705,223, 2,811,495 and 2,899,397, which patents are hereby incorporated by reference. Other polyamine curing agents are the adducts of polyamines and epoxy compounds such as those described in U.S. Pat. Nos. 2,651,589, 2,864,775 and 4,116,900, which patents are hereby incorporated by reference.

Other curing agents can be used in the composition of this invention, particularly when the coatings made from the compositions are heated to effect a cure. Examples of such additional curing agents are the aminoplast and phenolplast resins. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Aldehydes include formaldehyde, acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxymethylol urea, butylated polymeric urea-formaldehyde resins, hexamethoxymethyl melamine, methylated polymeric melamine-formaldehyde resins and butylated polymeric melamine-formaldehyde resins.

Phenolplast resins are the reaction products of phenols and aldehydes which contain reactive methylol groups. These compositions can be monomeric or polymeric in nature depending on the molar ratio of phenol to aldehyde used in the initial condensation reaction. Examples of suitable phenols are phenol, o, m or p-cresol, 2,4-xylenol, 3,4-xylenol, 2,5-xylenol, cardanol, p-tert-butyl phenol, and the like. Useful aldehydes are formaldehyde, acetaldehyde and propionaldehyde. Particularly useful phenolplast resins are polymethylol phenols wherein the phenolic group is etherified with an alkyl, e.g., methyl or ethyl, group.

An aqueous epoxy resin paint composition of the present invention may further contain additives conventionally employed in coating technology, such as organic pigments, inorganic pigments, surfactants, thickeners, and the like.

In normal usage, after a water-borne paint composition is prepared using a polyamine curing agent, it is coated on a substrate by roller, spray, dip, doctor blade, or similar application means. The film-formation and curing is accomplished by air-drying under ambient temperature conditions.

As a further embodiment, the present invention provides water-borne epoxy compositions which have properties suitable for use as a one-package coating system. This type of coating system is prepared by blending a stable epoxy dispersion composition as described above with a crosslinking agent which is substantially unreactive with the epoxy groups at room temperature. In this type of system, crosslinking is accomplished by baking an applied coating at an elevated temperature.

In addition to the aminoplast and phenolplast curing agents described hereinbefore, other crosslinking agents suitable for the one-package coating systems are novolacs, dibasic carboxylic acids, carboxyl phthalocyanines, dimer and trimer fatty acids, aliphatic and aromatic polycarboxylic acids; and their acid containing acrylic resins such as polyacrylic and polymethacrylic acids, anhydrides, amides and miscellaneous nitrogen compounds such as dicyandiamide and hydrazides. The various curing agents useful with epoxy resins are discussed in Lee and Neville's "Handbook of Epoxy Resins," McGraw-Hill (1967).

A present invention one-package coating system as described above can be cured by heating a coated article at a temperature between about 90°–250° C. for a period of time between about 5 minutes and two hours sufficient to effect a thermosetting cure.

The following examples are further illustrative of the present invention. The reactants and other specific ingredients are presented as being typical, and various modifications can be derived in view of the foregoing disclosure within the scope of the invention. Parts and percentages unless otherwise specified are parts and percentages by weight.

EXAMPLE A

This example illustrates a general method for preparing stable epoxy dispersion compositions in accordance with the present invention.

The following components are admixed and heated to 240°–280° F. with stirring under a nitrogen atmosphere:

| | |
|---|---|
| 617 g | Epi Rez 510 (Celenese)[1] |
| 179 g | Bisphenol A[2] |
| 2.1 g | Triphenylphosphine |
| 51 g | Novepox Tan 141 (Synthron, Inc.)[3] |

[1] Diglycidyl ether of Bisphenol A; epoxide equivalent weight of 190.
[2] 2,2-Bis(p-hydroxyphenyl)propane.
[3] Diglycidyl ether of Pluronic F 88 BASF-Wyandotte)[4].
[4] Block copolymer of ethylene oxide and propylene oxide with the polyoxypropylene block in the middle with terminal polyoxyethylene blocks. The copolymer contains 80 weight percent ethylene and 20 weight percent propylene, and the average molecular weight is 10,800.

At maximum exotherm the temperature rises to 335°–385° F. The temperature is maintained at 310°–330° F. for about an hour, then the heating and the flow of nitrogen are terminated.

A 0 to 250 gram quantity of ethylene glycol monoethyl ether is added to the reaction mixture, followed by the slow addition of 100 to 500 milliliters of deionized water as the temperature of the reaction mixture gradually decreases to about 130°–160° F. A dispersion of resin solids is formed which has a maximum particle size of about 3 microns. The reaction product can then be diluted with additional deionized water.

The resin solids generally constitute 50–60 weight percent of the aqueous dispersion and the dispersion has a viscosity of 1000 to 10,000 cps (Brookfield, Model RV Spindle No. 5, 20 RPM).

No settling of resin solids is observed in a pint sample after centrifuging at 1000 RPM for 30 minutes. No settling of resin solids occurs after 6 months of storage at room temperature and after 4 weeks at 125° F.

EXAMPLE I

The following components are admixed and heated to 280° F. with stirring under a nitrogen atmosphere:

| | |
|---|---|
| 617 g | Epi Rez 510 |
| 179 g | Bisphenol A |
| 2.1 g | Triphenylphosphine |
| 51 g | Novepox Tan 141 |

When the 280° F. temperature is attained, heating is discontinued and the temperature rises to 355° F. due to the exothermic reaction. The temperature then drops to 320° F. and is held at 315°-320° F. for about one hour, after which time the heat source is removed and the flow of nitrogen is terminated.

An 85 gram quantity of ethylene glycol monoethyl ether is added to the reaction mixture, followed by the slow addition of 200 milliliters of deionized water as the temperature of the reaction mixture gradually decreases to 150° F. A dispersion of resin solids is formed which has a maximum particle size of 3 microns. The reaction product is then diluted with an additional 208 grams of deionized water.

The resin solids of the aqueous dispersion are 56.5 weight percent and the viscosity of the dispersion is 2000 cps. (Brookfield, Spindle No. 5, 20 RPM).

No settling of resin solids is observed in a pint sample after centrifuging at 1000 RPM for 30 minutes. No settling of resin solids occurs after 6 months at room temperature.

EXAMPLE II

Employing a similar procedure of component addition and heating as in Example I, an epoxy dispersion is prepared from the following ingredients:

| | |
|---|---|
| 617 g | Epi Rez 510 (Celanese) |
| 719 g | Bisphenol A |
| 2.1 g | Triphenylphosphine |
| 70 g | Novepox Tan 117 (Synthron, Inc.)[1] |
| 70 g | Ethylene glycol monoethyl ether |
| 813 g | Deionized water |

[1]Diglycidyl ether of Pluronic F 38 (BASF-Wyandotte)[2]; epoxide equivalent weight of 4760.
[2]Block copolymer of ethylene oxide and propylene oxide having an average molecular weight of 5000.

Viscosity, 7800 cps (Brookfield, Spindle No. 5, 20 RPM).
Solids, 51.3%.
No settling after 43 minutes at 1000 RPM.
No settling after 6 months at room temperature.

EXAMPLE III

In a similar manner to that previously described, an epoxy dispersion is prepared from the following components:

| | |
|---|---|
| 617 g | Epi Rez 510 (Celanese) |
| 179 g | Bisphenol A |
| 2.1 g | Triphenylphosphine |
| 70 g | Novepox Tan 141 (Synthron, Inc.) |
| 70 g | Ethylene glycol monoethyl ether |
| 638 g | Deionized water |

Viscosity, 7500 cps (Brookfield, Spindle No. 5, 20 RPM).
Solids, 56.4%.
No settling after 30 minutes at 1000 RPM.
No settling after 5 months at room temperature.

EXAMPLE IV

This Example illustrates the preparation of a stable water-borne paint composition.

An epoxy dispersion is prepared in the manner previously described:

| | |
|---|---|
| 617 g | Epi Rez 510 (Celanese) |
| 719 g | Bisphenol A |
| 2.1 g | Triphenylphosphine |
| 33 g | Novepox Tan 141 (Synthron, Inc.) |
| 83 g | Ethylene glycol monoethyl ether |
| 471 g | Deionized water |

Viscosity, 4200 cps (Brookfield, Spindle No. 5, 20 RPM).
Solids, 60.2%.
No settling after 30 minutes at 1000 RPM.
No settling after 5 months at room temperature.

A paint composition is formulated with the following components:

| | | |
|---|---|---|
| I. | 381 g | Epoxy dispersion described above |
| | 250 g | Titanium dioxide |
| | 252 g | Water |
| II. | 165 g | Epi Cure CT 60-8534 (Celanese)[1] |

[1]60 Weight percent solution of a polyamido-amine in a solvent mixture of 60 weight percent ethylene glycol monobutyl ether, 20 weight percent ethylene glycol monoethyl ether and 20 weight percent toluene. The polyamido-amine has an equivalent weight of 380-385 on a solids basis.

The group I components are ground with a high speed dispersator. Then I and II are blended, and the resultant paint composition is drawn down (3 mil) on steel when it is freshly prepared, and also 2, 4 and 6 hours after preparation. The Pencil Hardness and Gloss are checked after drying overnight, and at intervals at room temperature, as listed below. Pencil Hardness is conducted according to ASTM D3363-74. Gloss is determined at 60° angle according to ASTM D523-8.

| Hardness | Fresh | 2 hours | 4 hours | 6 hours |
|---|---|---|---|---|
| Overnight | 2B | 2B | 2B | 2B |
| 2 days | 2B | 2B | 2B | 2B |
| 3 days | B | B | B | B |
| 8 days | B | B | B | HB |
| 15 days | B | B | B | HB |
| Gloss | | | | |
| Overnight | 81 | 62 | 64 | 45 |
| 1 week | 74 | 58 | 52 | 40 |
| 2 weeks | 78 | 66 | 54 | 46 |

EXAMPLE V

This Example illustrates a preparation of a high gloss paint formulation.

An epoxy dispersion is prepared with the following components; the Epoxide 7 component is added after the addition of the ethylene glycol monoethyl ether and after enough water is added to allow the formation of an oil in water emulsion.

| | |
|---|---|
| 617 g | Epi Rez 510 (Celanese) |

-continued

| | | |
|---|---|---|
| 719 g | Bisphenol A | |
| 52 g | Novepox Tan 141 (Synthron, Inc.) | |
| 0.3 g | Triphenylphosphine | |
| 121 g | Ethylene glycol monoethylether | |
| 209 g | Deionized water | |
| 17 g | Epoxide 7 (Procter & Gamble)[1] | |

[1]Glycidyl ether of $C_8$ and $C_{10}$ alcohol having an epoxide equivalent weight of 220-235.

Viscosity 7,600 cps (Brookfield, Model RV, Spindle No. 5 and 20 RPM).
Solids, 54.7%.
No settling after 30 minutes at 1000 RPM.
No settling after 8 months at RT.
No settling after 4 weeks at 120° F.
No settling after 2 Freeze and thaw cycles (ASTM D2243-68).

In a manner similar to that previously described, paint compositions are prepared with the following components.

| | | | | |
|---|---|---|---|---|
| I. | 367 g | Epoxy dispersion described above | | |
| | 77 g | Water | | |
| | 148 g | Epi Cure CT-60-8534 (Celanese) | | |
| | 2.7 g | Glacial Acetic Acid | | |
| II. | 250 g | Titanium Dioxide | | |
| | 30 g | Hydrite UF (Georgia Kaolin Co.)[2] | | |
| | 190 g | Water | | |
| Hardness | Fresh | 2 hours | 6 hours | |
| 3 days | 2B | B | 2B | |
| 1 week | HB | HB | HB | |
| 2 weeks | HB | HB | HB | |
| Gloss | | | | |
| 3 days | 99 | 99 | 95 | |
| 1 week | 99 | 99 | 94 | |
| 2 weeks | 98 | 97 | 92 | |

[2]China Clay - Aluminum Silicate.

EXAMPLE VI

This is another example of a high gloss paint formulation made from the epoxy resin emulsion in Example V. The film hardness and gloss are determined by the same methods as described in Example V.

| | | | |
|---|---|---|---|
| I. | 367 g | Epoxy dispersion described in Example V | |
| | 13 g | Benzyl Alcohol | |
| | 5 g | Triton X-100 (Rohm & Haas Co.)[1] | |
| | 5 g | Tamol 731 (Rohm & Haas Co.)[2] | |
| | 250 g | Titanium Dioxide | |
| | 262 g | Water | |
| II. | 148 g | Epi Cure CT-60-8534 (Celanese) | |
| Hardness | Fresh | 6 Hours | |
| 1 day | 4B | 4B | |
| 2 days | 2B | 2B | |
| 1 week | HB | HB | |
| 2 weeks | HB | HB | |
| Gloss | | | |
| 1 day | 100 | 100 | |
| 1 week | 100 | 100 | |
| 2 weeks | 100 | 100 | |

[1]Octyl phenoxy polyethoxy ethanol.
[2]Sodium salt of polymeric carboxylic acid.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A stable epoxy dispersion composition comprising (1) an aqueous medium; and (2) between about 50-70 weight percent of self-emulsifying epoxy resin which is the addition product of reactants comprising (a) 40-90 parts by weight of diglycidyl ether of dihydric phenol, (b) 5-35 parts by weight of dihydric phenol, and (c) 2-15 parts by weight of diglycidyl ether of polyoxyalkylene glycol, wherein the molecular weight of the epoxy resin is in the range between about 500-20,000.

2. An epoxy dispersion in accordance with claim 1 wherein the diglycidyl ether of dihydric phenol in (a) is diglycidyl ether of bisphenol A.

3. An epoxy dispersion in accordance with claim 1 wherein at least a portion of the diglycidyl ether of dihydric phenol in (a) is replaced with diglycidyl ether of 2,2-bis(4-hydroxycyclohexyl)propane.

4. An epoxy dispersion in accordance with claim 1 wherein the dihydric phenol in (b) is bisphenol A.

5. An epoxy dispersion in accordance with claim 1 wherein the diglycidyl ether of polyoxyalkylene glycol in (3) is diglycidyl ether of polyoxyethylene glycol.

6. An epoxy dispersion in accordance with claim 1 wherein the diglycidyl ether of polyoxyalkylene glycol in (3) is diglycidyl ether of polyoxypropylene glycol.

7. An epoxy dispersion in accordance with claim 1 wherein the diglycidyl ether of polyoxyalkylene glycol in (3) is diglycidyl ether of polyoxyethylene-propylene glycol.

8. An epoxy dispersion in accordance with claim 1 wherein the diglycidyl ether of polyoxyalkylene glycol in (3) has a molecular weight in the range between about 4,000-20,000.

9. A stable epoxy dispersion composition comprising (1) an aqueous medium; (2) between about 50-70 weight percent of self-emulsifying epoxy resin which is the addition product of reactants comprising (a) 40-90 parts by weight of diglycidyl ether of dihydric phenol, (b) 5-35 parts by weight of dihydric phenol, and (c) 2-15 parts by weight of diglycidyl ether of polyoxyalkylene glycol, wherein the molecular weight of the epoxy resin is in the range between about 500-20,000; and (3) 1-25 weight percent, based on resin solids weight, of water-immiscible $C_8$-$C_{80}$ aliphatic monoepoxide reactive diluent.

10. An epoxy dispersion in accordance with claim 9 wherein the monoepoxide diluent in (3) is glycidyl ether of monohydric $C_8$-$C_{17}$ aliphatic alcohol.

11. A freeze-thaw resistant epoxy dispersion composition comprising (1) an aqueous medium; (2) between about 50-70 weight percent of self-emulsifying epoxy resin which is the addition product of reactants comprising (a) 40-90 parts by weight of diglycidyl ether of dihydric phenol, (b) 5-35 parts by weight of dihydric phenol and (c) 2-15 parts by weight of diglycidyl ether of polyoxyalkylene glycol, wherein the molecular weight of the epoxy resin is in the range between about 500-20,000; (3) 1-25 weight percent, based on resin solids weight, of water-immiscible $C_8$-$C_{20}$ aliphatic monoepoxide reactive diluent; and (4) 5-20 weight percent, based on resin solids weight, of water-miscible solvent selected from $C_2$-$C_{10}$ glycols and glycol ethers.

12. An epoxy dispersion in accordance with claim 11 wherein the solvent in (4) is ethylene glycol or ethylene glycol alkyl ether.

13. An epoxy dispersion in accordance with claim 11 wherein the solvent in (4) is diethylene glycol or diethylene glycol alkyl ether.

14. An epoxy dispersion in accordance with claim 11 wherein the solvent in (4) is propylene glycol or propylene glycol alkyl ether.

15. An epoxy dispersion in accordance with claim 11 wherein the solvent in (4) is dipropylene glycol or dipropylene glycol alkyl ether.

16. A water-borne paint composition comprising (1) an aqueous medium; (2) between about 50-70 weight percent of self-emulsifying epoxy resin which is the addition product of reactants comprising (a) 40-90 parts by weight of diglycidyl ether of dihydric phenol, (b) 5-35 parts by weight of dihydric phenol, and (c) 2-15 parts by weight of diglycidyl ether of polyoxyalkylene glycol, wherein the average molecular weight of the epoxy resin is in the range between about 500-20,000; and (3) polyamine curing agent, wherein the ratio of active amino hydrogens to epoxy groups is in the range between about 0.5-2:1.

17. A water-borne paint composition in accordance with claim 16 which contains pigment.

18. A process for providing a substrate surface with a protective coating which comprises applying a water-borne paint composition in accordance with claim 16 to the substrate surface, and thereafter allowing the substrate coating to cure under ambient conditions to form a continuous thermoset film.

19. A one-package water-borne epoxy coating composition comprising (1) an aqueous medium; (2) between about 50-70 weight percent of self-emulsifying epoxy resin which is the addition product of reactants comprising (a) 40-90 parts by weight of diglycidyl ether of dihydric phenol, (b) 5-35 parts by weight of dihydric phenol, and (c) 2-15 parts by weight of diglycidyl ether of polyoxyalkylene glycol, wherein the average molecular weight of the epoxy resin is in the range between about 500-20,000; and (3) a curing agent which is substantially unreactive with epoxy groups at ambient temperature, and which is epoxy-interacting and thermosetting at a temperature in the range between about 90°-250° C.

* * * * *

UNITED STATES PATENT AND TRADEMARK OFFICE
CERTIFICATE OF CORRECTION

PATENT NO. : 4,315,044
DATED : Feb. 9, 1982
INVENTOR(S) : Jimmy D. Elmore & Joseph L. Cecil It is certified that error appears in the above—identified patent and that said Letters Patent is hereby corrected as shown below:

Column 2, Line 15, delete "novolak", insert --novolac--.
Column 5, Line 35, delete "dimethoxymethylol", insert --dimethoxymethyl--.
Column 6, Line 40, delete "Celenese", insert --Celanese--.
Line 46, insert --(-- after "F 88".
Column 7, Line 42, delete "719", insert --179--.
Column 8, Line 14, delete "719", insert --179--.
Column 9, Line 2, delete "719", insert --179--.

Signed and Sealed this

Eleventh Day of May 1982

[SEAL]

Attest:

GERALD J. MOSSINGHOFF

Attesting Officer

Commissioner of Patents and Trademarks